United States Patent [19]

De Prycker et al.

[11] Patent Number: 5,027,351
[45] Date of Patent: Jun. 25, 1991

[54] ASYNCHRONOUS TIME DIVISION COMMUNICATION SYSTEM

[75] Inventors: Martin L. F. De Prycker, Sint Niklaas; Mark L. M. R. Ryckebusch, Sint-Pieters-Leeuw; Peter I. A. Barri, Bonheiden, all of Belgium

[73] Assignee: Alcatel N.V., Amsterdam, Netherlands

[21] Appl. No.: 415,274

[22] Filed: Sep. 18, 1989

[30] Foreign Application Priority Data

Mar. 18, 1987 [BE] Belgium .............................. 8700282

[51] Int. Cl.$^5$ .......................... H04L 12/56; H04J 3/06
[52] U.S. Cl. ...................................... 370/94.1; 370/60; 370/77; 370/100.1
[58] Field of Search .................... 370/58.1, 58.2, 58.3, 370/60, 60.1, 94.1, 100.1, 108, 106, 101, 17; 340/825.06, 825.14, 825.2; 375/114, 118, 119

[56] References Cited

U.S. PATENT DOCUMENTS

| | | | |
|---|---|---|---|
| 4,359,770 | 3/1980 | Suzuka | 370/108 |
| 4,434,498 | 5/1981 | Mathieu | 375/114 |
| 4,569,042 | 2/1986 | Larson | 370/60 |
| 4,603,416 | 12/1983 | Servel et al. | 370/60 |
| 4,817,085 | 3/1989 | De Prycker | 370/60 |
| 4,881,223 | 11/1989 | Debuysscher | 370/100.1 |
| 4,937,814 | 6/1990 | Weldink | 370/60 |

FOREIGN PATENT DOCUMENTS 2579047 9/1986 France .

Primary Examiner—Douglas W. Olms
Assistant Examiner—Alpus H. Hsu
Attorney, Agent, or Firm—P. C. Van Der Sluys

[57] ABSTRACT

An asynchronous time division communication system having at least one station including a buffer and an associated processor for writing data packets into said buffer at a sending clock frequency, and for reading data packets from said buffer at a receiving clock frequency. The processor is further capable of assessing the real packet filling level of the buffer and adjusting the receiving clock frequency in corresponding relationship to the assessed real packet filling level. The processor calculates a mean packet filling level after a measured time has elapsed by using the mean of m successively assessed real packet filling levels of said buffer and using the calculated mean packet filling level for adjusting the receiving clock frequency.

14 Claims, 2 Drawing Sheets

ASYNCHRONOUS TIME DIVISION COMMUNICATION SYSTEM

BACKGROUND OF THE INVENTION

1. Field of the Invention

The present invention relates to an asynchronous time division communication system with at least one station including a buffer circuit and associated processing means to write data packets in said buffer circuit at a send clock frequency and to read data packets from said buffer circuit at a receive clock frequency, said processing means being further able to assess the real packet filling level of said buffer circuit and to adjust said receive clock frequency in function of the thus assessed real filling level.

2. Description of the Prior Art

Such a communication system is known in the art, e.g. from the published French patent application No. 2579047. Therein the receive or read clock frequency is directly regulated by means of the assessed real filling level of the buffer circuit, so that the number of regulations performed may be excessively high, especially when in the system the data packets are subjected to stochastic delays as these give rise to frequent changes of the real filling level of the buffer. Such stochastic delays are not taken into account in the known system.

SUMMARY OF THE INVENTION

An object of the present invention is to provide an asynchronous time division communication system of the above type but which allows the number of adjustments of the receive clock frequency to be considerably reduced, especially when these packets are subjected to stochastic delays in the system.

According to a characteristic feature of the present communication system said processing means is able to calculate a mean packet filling level after a measuring time has elapsed, by taking the mean of m successively assessed real filling levels of said buffer circuit and to use the thus obtained mean packet filling level for adjusting said receive clock frequency.

By using the mean filling level instead of the real filling level the influence on this filling level of stochastic delays to which the data packets may be subjected in the system, is considerably reduced due to which the number of fine adjustments of the user receive clock is decreased.

Another characteristic feature of the present system is that said processing means adjusts the frequency of said receive clock with the help of a measure of the send clock, said measure being provided by frequency measuring means in another station generating said data packets and being transmitted therefrom under the form of a control packet.

Thus an initial synchronisation of the above receive clock in the at least one station with the send clock in the other station is realised.

DESCRIPTION OF THE DRAWINGS

The above mentioned and other objects and features of the invention will become more apparent ad the invention itself will be best understood by referring to the following description of an embodiment taken in conjunction with the accompanying drawings wherein.

DETAILED DESCRIPTION OF THE PREFERRED EMBODIMENT

Figure 1:
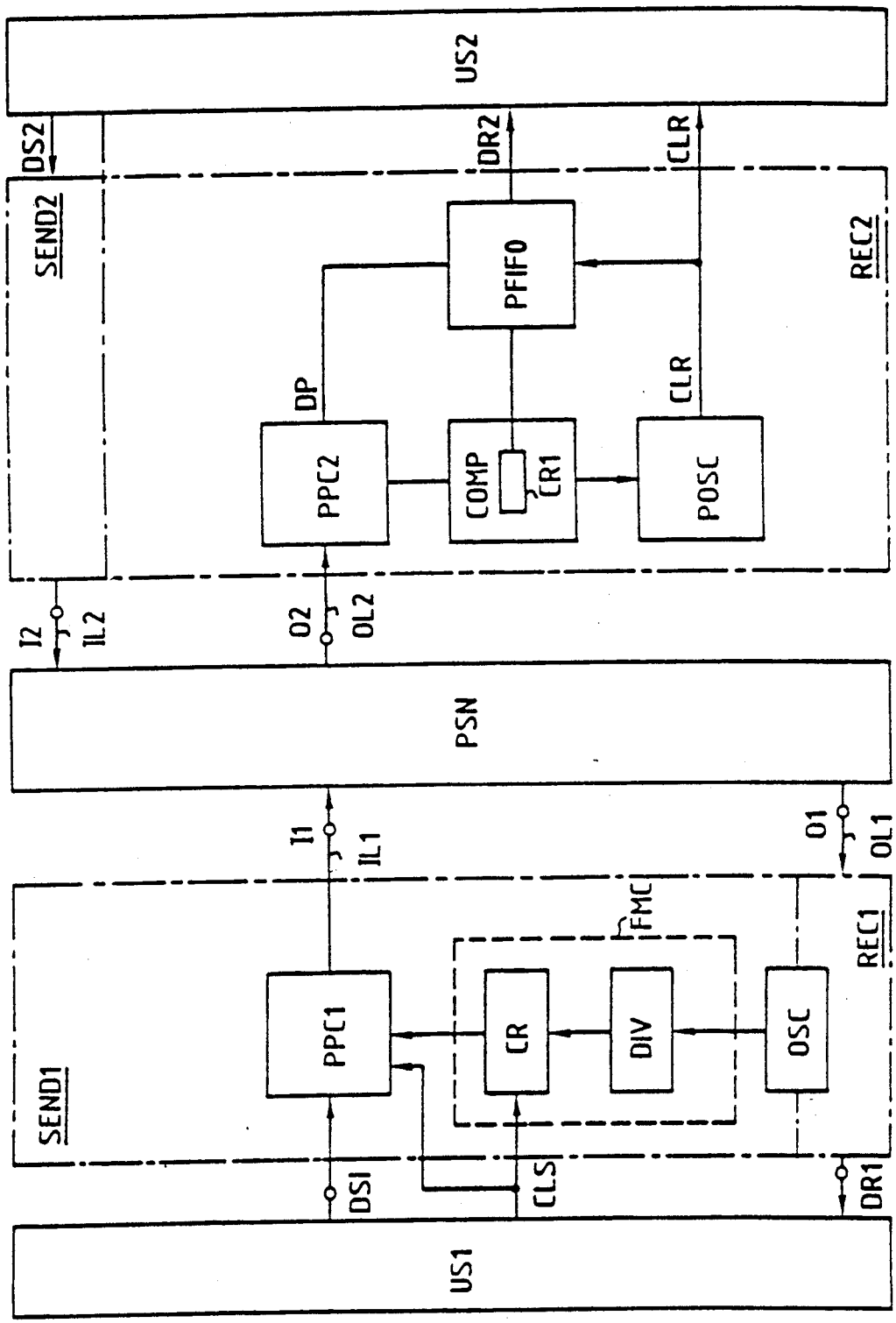
FIG. 1 represents an asynchronous time division multiplex communication system according to the invention.

This asynchronous communication system includes one or more nodes which are coupled by means of transmission lines, but for reasons of simplicity only one of these nodes is represented in relative detail in the drawing. The system includes a packet switching network PSN with a plurality of input and output terminals to which user stations having associated send and receive circuits are coupled via respective transmission lines. In the drawing only two pairs of input and output terminals I1, O1, and I2, O2 and two user stations US1 and US2 with associated send and receive circuits SEND1, REC1; SEND2, REC2 are shown. The data output DS1 and the send clock output CLS of the user station US1 are connected to the send circuit SEND1 which is coupled with the input terminal I1 of PSN via the transmission line IL1, whilst the output terminal O1 of PSN is coupled via the transmission line OL1 with the receive circuit REC1 coupled with the data input DR1 of US1. In an analogous way REC2 and SEND2 are connected to PSN and US2.

Since the send circuit SEND1 and SEND2 are identical and because this is also true for the receive circuits REC1 and REC2, in the drawing only the send circuit SEND1 of US1 and the receive circuit REC2 of US2 are represented in detail.

The send circuit SEND1 includes a packet processing circuit PPC1 and a frequency measuring circuit FMC which comprises an oscillator OSC (common to REC1 and SEND1), a divider DIV and a counter CR. These circuits are coupled in the shown way between the data and clock outputs DS1 and CLS of the user station US1 and the input terminal I1 of PSN.

The receive circuit REC2 includes a computer COMP, a packet processing circuit PPC2, a packet buffer circuit PFIFO and a programmable oscillator POSC. These circuits are also coupled in the shown way between the output terminal O2 of PSN and the data and clock inputs DR2 and CLR of the user station US2.

When the user stations US1 and US2 wish to exchange data, two unidirectional connections are established between US1 and US2 during a signalling phase. This happens after the exchange of control packets. These connections are the following:

from US1 to US2 via SEND1, IL1, PSN, OL2 and REC2;

from US2 to US1 via SEND2, IL2, PSN, OL1 and REC1.

After the end of this signalling phase the stations US1 and US2 may start with the exchange of data. The data stream which is for instance transmitted by the station US1 appears at the data output DS1 thereof and is transmitted together with the user send clock signal CLS to the send circuit SEND1 associated to US1. Therein this data stream is transformed into packets in the packet processing circuit PCC1 which is controlled by the clock signal CLS, and these data packets are then supplied to the input terminal I1 of the switching network PSN via the transmission line IL1. By the switching network PSN these code packets are switched to the output terminal O2 and from there they are transmitted to the packet processing circuit PCC2 via the transmission line OL2. From there they are stored in the packet buffer circuit PFIFO via the output DP. Subsequently they are read from this PFIFO and transformed into a data stream, both under the control of the user receive clock signal CLR provided by the programmable oscillator POSC. This data stream which appears at the output DR2 of PFIFO and this clock signal CLR are finally applied to inputs DR2 and CLR of the user station US2.

If the transmitted data are asynchronous data the user stations US1 and US2 need not to be synchronised. However, this is necessary when these stations wish to exchange synchronous data, e.g. telephone data at 64 kbit/sec., such as will be assumed in the following, because in an asynchronous system the frequency of the receive clock CLR in the receive circuit REC2 cannot be recovered from the incoming data stream. Synchronous data are to be understood as data streams having a constant bit speed. To damp the statistical delays of such data streams to a certain extent an additional delay is realised in the buffer circuit PFIFO. The value of this additonal delay is for instance chosen in the way described in the above mentioned French patent. However, as already mentioned the measure is unsufficient when the frequency of the user send clock signal CLS deviates from the user receive clock signal CLR, although these clock signals have the same frequency, because the buffer circuit PFIFO may thus become empty or overflow, information loss being the result.

The synchronizing means described hereafter synchronize the clock signal CLR with the clock signal CLS which nominally have the same frequency, e.g. 64 kHz. This happens during a first phase by realising an initial synchronization by adjusting the frequency of the receive clock POSC in the station US2 and which provides the clock signal CLR to the frequency of the clock signal CLS, this frequency or a measure thereof being transmitted from the station US1 to the station US2 during this first phase. During a second phase a fine adjustment of the initial synchronization is then realised by executing a measurement and regulation algorithm. The latter consists in assessing the packet filling level of the buffer circuit PFIFO, i.e. the number of packets stored therein, at regular moments and to adjust the frequency of CLR on the basis thereof.

The first phase is performed at the end of the above mentioned signalling phase. During this first phase the frequency of the clock signal CLS is measured in the send circuit SEND1 by means of the frequency measuring circuit FMC which comprises the oscillator OSC, the divider DIV and the counter CR, as mentioned above. This happens by deriving, by division, a time base with a period of for instance 1 second from the frequency of the oscillator OSC. During this period the counter CR then counts the number of periods of the user send clock CLS. In other words, the frequency of this clock signal CLS is measured and is for instance equal to P periods per second. This value is transferred to the packet processing circuit PPC1 which as a consequence thereof assembles a control packet whose data is constituted by this frequency value P. This control packet is transmitted via the switching network PSN to the packet processing circuit PCC2 and is processed therein. The frequency value P stored in this packet is transferred to the computer COMP which uses the value to adjust the frequency of the programmable oscillator POSC in such a way that it becomes equal to P periods per second, i.e. the frequency of OSC.

The above described initial synchronization of the clock signals CLS and CLR is not perfect, e.g. due to errors in the frequency measurement of CLS and the limited accuracy of the oscillator OSC due to age and temperature. This is the reason of the fine adjustment performed during the second phase described hereafter.

During this second phase which starts as soon as data packets are stored in the buffer circuit PFIFO, the computer COMP, and more particularly a bidirectional counter CR1, receives from this buffer circuit a signal each time a packet enters this circuit and also when a packet leaves this circuit, the circuit being read under the control of the clock signal CLR. In this way the computer from the contents of CR1 knows the number of packets $X_i$ present in the buffer circuit, i.e. the real filling level of this buffer circuit. The variations of this filling level are due not only to the difference between the frequencies of the send and receive clock signals CLS and CLR, but also to stochastic delays of the packets during their transmission in the system.

If these stochastic delays were not existing then the computer COMP could regulate the frequency of the clock signal CLR in the following way.

In the assumption that n is the nominal value of $X_i$, a possible series of values of $X_i$ is for instance . . . ,n,. . . ,n,n+1,. . . ,n+1,n+2, . . . ,n+2

Each time a packet leaves the buffer circuit, i.e. after each packet reading period, the computer assesses whether or not the filling level $X_i$ of this buffer circuit has changed by one unity and measures the time y, e.g. in packet read periods, between the changes of this filling level, on the one hand from n to n+1 and on the other hand from n+1 to n+2. It thus obtains a measure of the difference between the frequencies of CLS and CLR. When this frequency difference for instance amounts to Z, expressed in fraction of the nominal value of CLR, then the computer may bring back the filling level of the buffer circuit PFIFO to the nominal value n by changing the clock POSC, providing CLR, by $-2Z$ during a time interval 2Y.

This measurement and regulation algorithm is not simply indicated for being used in case stochastic delays occur, because the value $X_i$ may then change too many times and because this would then each time give rise to an adjustment of the clock frequency of the clock CLR. The principle of this measurement and regulation algorithm, i.e. the assessment of the changes of the filling level of the buffer circuit PFIFO and the measurement of the time between such changes may however also be maintained in the case of stochastic delays.

To considerably decrease the influence of these stochastic delays on the measurement and regulation algorithm and in order not to be compelled to perform numerous adjustments of the clock CLR, the use in this algorithm of the mean filling level, i.e. the mean of $X_i$ instead of real filling level $X_i$ has been thought of. Indeed, in this way the measurement and regulation algorithm becomes less sensitive to variations of $X_i$ due to stochastic delays.

However, the real probability distribution of $X_i$ is unknown, so that also neither the real mean $X_g$ nor the real standard deviation of this probability distribution are known. A good approximation of $X_g$ may however be obtained by calculating the mean X of m successive filling levels $X_i$, during a measuring time equal to m packet filling periods, m having to be sufficiently large as will be explained later.

Because the frequencies of the clock signals CLS and CLR differ only slightly, the time period during which a variation by one unity of the mean filling level may occur is relatively large compared to the measuring time. For this reason the filling level cannot change by more than one unity during such a measuring time and the variations of this filling level are thus only caused by stochastic delays.

For these reasons and if one would know the real mean Xg of Xi then one would be able to check the variation by one unity of the real mean filling level Xg by calculating if the following relation is satisfied or not, $$Xg > = q + \tfrac{1}{2} \tag{1}$$

wherein q is the mean real filling level accepted after a previous calculation and is an integer, and by: accepting that the new mean filling level is $$q \pm 1 \text{ when } Xg > = q + \tfrac{1}{2}$$

accepting that the new mean filling level q is still equal to the previous one when $$Xg < q \pm \tfrac{1}{2}$$

In the following only the plus sign is considered for simplicity reasons.

As already mentioned Xg is however not known. But when the value of m is chosen sufficiently large—which is the case here as will become clear later—then the probability distribution of the mean X tends to a normal distribution, this distribution having a variance which are equal to Xg and $S^2/m$ respectively. Hereby Xg and S are the mean and the standard deviation of the real probability distribution respectively. The standard deviation s of each series of Xi's hereby is a proper estimation of S and may therefore be used instead of S. Instead of using the real mean filling level Xg and the real standard deviation the computer may thus operate with the calculated mean filling level and with the standard deviation s.

Instead of checking the relation (1) during the execution of the measuring and regulation algorithm the computer could check, after each measuring time comprising m packet read periods, if $$X > = p + \tfrac{1}{2} \tag{2}$$

wherein X and p are the newly calculated filling level and the filling level accepted after a previous calculation respectively and wherein p is an integer. In reality the computer checks if $$X > = p + \tfrac{1}{2} - D \tag{3}$$

wherein D is a safety margin the reason of which will be explained later.

More particularly:

if $X > = a - D$, with $a = p + \tfrac{1}{2}$, then the computer concludes that a change with one unity of the mean filling level has taken place and that p is the newly accepted filling level;

if $X < a - D$, then it concludes that no change of the mean filling level with one unity has occurred and that the accepted filling level is still p.

However, by proceeding in this way errors occur with respect to the theoretical case which would consist in checking whether or not the real mean Xg has exceeded the value a.

A first possible error is that although $Xg > = a$ it is assessed that $$X < a - D \tag{4}$$

The worst case is obviously that this assessment is made when $Xg = a$.

A second possible error is that although $Xg < a$, it is assessed that $$X > = a - D \tag{5}$$

The probabilities R1 and R2 of the occurrence of these errors may be calculated as follows because—as already mentioned—the distribution of the mean X is a normal distribution if m is sufficiently large. When F is the normal cumulative distribution function, R1 is given by:

$$R1 = F\left( \frac{(a - D) - Xg}{S/\sqrt{m}} \right) \tag{6}$$

As already mentioned the worst case occurs when it is assessed, although $Xg = a$, that $X < a - D$. If this is so, it follows from the relation (6) that:

$$D = F^{-1}\left( (1 - R1) \frac{S}{\sqrt{m}} \right) \tag{7}$$

wherein $F^{-1}$ is the inverse of the function F.

As already mentioned above s may be substituted for S. Moreover, if it is assumed that the maximum delay which a packet may undergo is smaller than half the mean time elapsing between the receipt of two such packets, the real filling level Xi of the buffer circuit cannot change by more than one unity during a measuring time. The maximum value of s is therefore equal to $\tfrac{1}{2}$. Because this maximum value only occurs in the proximity of a change of the filling level and because it are just these changes which are of importance, the substitution of s by this maximum has no appreciable influence. Moreover, in this way the computer load is decreased because it has not to calculate the value of s after each measurement.

For this reason, a $\tfrac{1}{2}$ is substituted for S in the relation (7), so that if R1 is for instance limited to the value 0.001, it follows from the relation (7) that $$D = \frac{1.55}{\sqrt{m}} \tag{8}$$

from which it follows that D and m are dependent from each other.

The probability R2 may be written as follows:

$$R2 = 1 - F\left( \frac{(a - D) - Xg}{S/\sqrt{m}} \right) \tag{9}$$

From the relations (6) and (9) it may be dirived that when $Xg = a - 2D$ the value of R2 is equal to the value (0.0001) or R1 when $Xg=a$. On the other hand, the value of R2 for $Xg=a$ is equal to $1-R1$, i.e. 0.9999.

Figure 2:
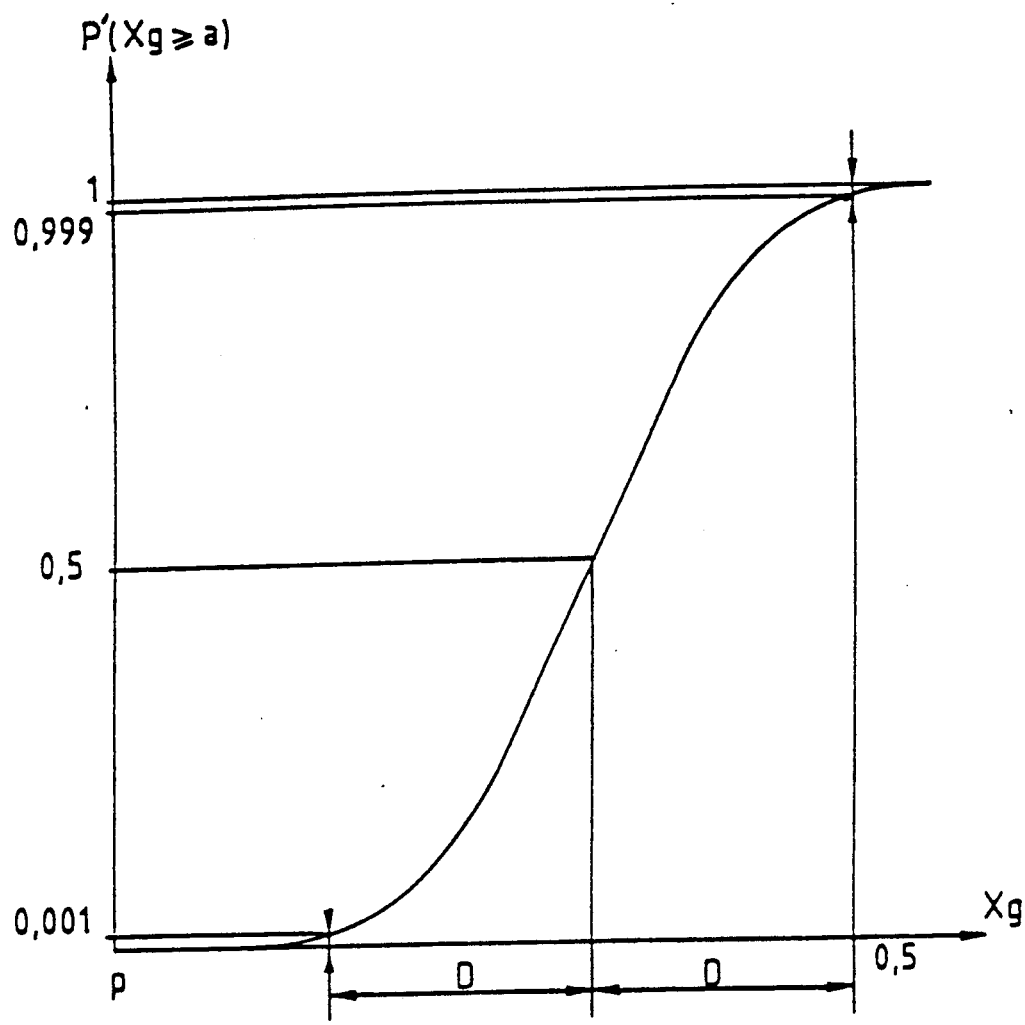
FIG. 2 is a diagram used to illustrate the operation of this system.

The curve of the probability $P'(Xg>=a)$ that it is accepted on the basis of the measuring and regulation algorithm that $Xg>=a$, is represented in FIG. 2. Therefrom it follows that this probability:
- is equal to 99.9% when $Xg=a$;
- amounts to 0.1% when $Xg=a-2D$;
- is equal to 50% when $D=O$.

By using the safety margin D when executing the algorithm the computer thus assesses with a probability of 99.9% instead of with a probability of 50% (without the use of D) that $Xg>=a$ when it finds that $X>=a-D$.

From the curve shown it also follows that:
- when $Xg<a-2D$, there is nearly never concluded that $Xg>=a$;
- when $Xg>=a$, there is nearly always concluded that $Xg>=a$.

In other words, the acceptance of $Xg>=a$ is only uncertain for values of Xg comprised between a and $a-2D$.

From the above it follows that the computer by executing the measurement and regulation algorithm may assess the increase by one unity of the filling level of the buffer circuit PFIFO with a maximum inaccuracy of 2D. Since the computer performs this assessment after every m packet read periods, a time of approximately m such periods may have elapsed since the assessed change. In other words, the time measured, e.g. t1 expressed in packet read periods, is inaccurate with a maximum error equal to m also expressed in packet read periods.

The computer performs such a time measurement each time a change is found and when two successive changes in the same sense have occurred it measures the time $y=t2-t1$ between these two changes. Thus it does not perform a measurement when these two changes occur in a different sense because in this way a regulation is automatically performed. Because both the errors 2D and m of each of these measurements occur in the same sense, 2D and m are also the errors on the measured value y. This means that the total relative error R on this value y is given by $$R = 2D + \frac{m}{y} \quad (10)$$

By taking the relation (8) into account, the relation (10) becomes $$R = \frac{3.1}{\sqrt{m}} + \frac{m}{y} \quad (11)$$

From this relation it follows that the maximum value M of m, i.e. the one which makes the relative error R minimum, is given by $$M = 1.339 . y^{\frac{2}{3}} \quad (12)$$

This means that this maximum value M of m is dependent on the measured value y, expressed in packet reading periods. Because y on the one hand indicates after how many such periods a change by one packet of the filling level of the buffer circuit has been detected and because one, on the other hand, knows the frequency difference of the clock OSC and POS corresponding to such a one packet read period, the frequency difference of the clocks may be derived from the measurement of y and thus be corrected by an adjustment of the receive clock POS. The value M of m has to be selected for the values of y which will occur most frequently and once this value of m has been selected the value of D is determined by means of the formule (8).

While the principles of the invention have been described above in connection with specific apparatus, it is to be clearly understood that this description is made only by way of example and not as a limitation on the scope of the invention.

We claim:

1. Asynchronous time division communication system with at least one station (US2, REC2, SEND2) including a buffer circuit (PFIFO) and associated processing means (PPC2, COMP) to write data packets in said buffer circuit at a send clock (OSC, CLS) frequency and to read data packets from said buffer circuit at a receive clock (POSC, CLR) frequency, said processing means being further able to assess the real packet filling level of said buffer circuit and to adjust said receive clock frequency as a function of the thus assessed real packet filling level, characterized in that said processing means (PPC2, COMP) is able to calculate a mean packet filling level (X) after a measuring time has elapsed, by taking the mean of m successively assessed real packet filling levels of said buffer circuit (PFIFO) and to use the thus obtained mean packet filling level for adjusting said receive clock frequency (POSC, CLR).

2. Communication system according to claim 1, characterized in that said measuring time is equal to m packet reading periods from the buffer circuit (PFIFO).

3. Communication system according to claim 1, characterized in that said processing means (PPC2, COMP) is able to assess the occurrence of a change of the mean packet filling level (X) by a predetermined value, to measure the time (y) between two such successive changes, and to adjust the receive clock frequency (POSC, CLR) as a function of the time measured (y).

4. Communication system according to claim 1, characterized in that said processing means (PPC2, COMP) is able to assess the occurrence of a change of the real packet filling level (Xi) by a predetermined value (1), to measure the time (y) between two such successive changes and to adjust the frequency of said receive clock (POSC, CLR) frequency as a function of said measured time (y).

5. Communication system according to claim 3, characterized in that said predetermined value is equal to 1.

6. Communication system according to claim 3, characterized in that said processing means (PPC2, COMP) measures the time (y) between two successive changes of the mean (X) packet filling level when the two changes occur in the same sense.

7. Communication system according to claim 3, characterized in that the system is such that the change of the mean packet filling level (X) during said measuring time is at most equal to 1 and that each time said processing means (PPC2, COMP) finds out that the calculated mean packet filling level (X) exceeds said previous mean packet filling level (X') by at least $\frac{1}{2}$, it assumes that the new mean packet filling level is equal to the previous packet filling level plus 1 (X'+1) and each time said processing means (PPC2, COMP) finds out that the calculated mean packet filling level (X) does not exceed said previous mean packet filling level (X')

by at least ½, it assumes that the new mean packet filling level is equal to the previous mean packet filling level (X').

8. Communication system according to claim 3, characterized in that the system is such that the change of the mean packet filling level (X) during said measuring time is at most equal to 1 and that each time said processing means (PPC2, COMP) finds out that the calculated mean packet filling level exceeds a previous mean packet filling level (X') by least ½ − D, it assumes that the new mean packet filling level is equal to the previous mean packet filling level plus 1 (X'+1) and each time said processing means (PPC2, COMP) finds out that the calculated mean packet filling level does not exceed a previous mean packet filling level (X') by at least ½ − D, it assumes that the new mean packet filling level is equal to the previous mean packet filling level (X'), D being a number representing a predetermined safety margin.

9. Communication system according to claim 8, characterized in that D is proportional to $\sqrt{m}$.

10. Communication system according to claim 9, characterized in that m is so chosen that it is proportional to $y^{2/3}$, y being said time measured.

11. Communication system according to claim 1, characterized in that said processing means (PPC2, COMP) is coupled to said buffer circuit (PFIFO) and includes a bidirectional counter (CR1) which is decremented each time a data packet is read from and incremented each time a data packet is written into said buffer circuit, whereby the state of said counter indicates the real packet filling level (Xi) of the buffer circuit.

12. Communication system according to claim 1, characterized in that said processing means (PPC2, COMP) adjusts the frequency of said receive clock (POSC, CLR) with the help of a measure (P) of the send clock (OSC, CLS), said measure being provided by frequency measuring means (FMC) in another station generating said data packets and has been transmitted therefrom under the form of a control packet.

13. Communication system according to claim 4, characterized in that said predetermined value is equal to 1.

14. Communication system according to claim 4, characterized in that said processing means (PPC2, COMP) measures the time (y) between two successive changes of the real (Xi) packet filling level, when the two changes occur in the same sense.

* * * * *